United States Patent
Lane et al.

(10) Patent No.: US 7,650,909 B2
(45) Date of Patent: Jan. 26, 2010

(54) FLOW DEVELOPMENT CHAMBER

(75) Inventors: Darin L. Lane, Kiowa, CO (US); Walter D. Prince, Littleton, CO (US); Alan Miller, Littleton, CO (US)

(73) Assignee: SpiroFlo, Inc., Sheridan, CO (US)

( * ) Notice: Subject to any disclaimer, the term of this patent is extended or adjusted under 35 U.S.C. 154(b) by 34 days.

(21) Appl. No.: 11/475,742

(22) Filed: Jun. 26, 2006

(65) Prior Publication Data

US 2007/0028976 A1 Feb. 8, 2007

Related U.S. Application Data

(60) Division of application No. 10/685,174, filed on Oct. 14, 2003, now Pat. No. 7,066,207, which is a continuation of application No. 10/011,493, filed on Dec. 4, 2001, now Pat. No. 6,659,118.

(51) Int. Cl.
*F15C 1/16* (2006.01)

(52) U.S. Cl. ................................ 137/810; 137/812

(58) Field of Classification Search .................. 137/808, 137/810, 812
See application file for complete search history.

(56) References Cited

U.S. PATENT DOCUMENTS

| | | |
|---|---|---|
| 835,619 A | 11/1906 | Isaacs et al. |
| 954,944 A | 4/1910 | Dunn |
| 1,254,393 A | 1/1918 | Clendon |
| 1,496,345 A | 6/1924 | Lichtenthaeler |

(Continued)

FOREIGN PATENT DOCUMENTS

CH 140881 9/1930

(Continued)

OTHER PUBLICATIONS

Supplementary Partial European Search Report for Pat. No. US0237883 dated Feb. 23, 2005, four sheets.

(Continued)

*Primary Examiner*—John Rivell
*Assistant Examiner*—Craig M Schneider
(74) *Attorney, Agent, or Firm*—Christie, Parker & Hale, LLP

(57) ABSTRACT

A system and method for conveying flowable material through a conduit that creates a strong laminar flow of the material surrounded by a boundary layer flow of the same or a different flowable material, such that long transport distances through dramatic elevation and directional changes can be achieved. Some embodiments of the system include a blower assembly, an inlet conduit, an outlet conduit and a mixing chamber, wherein the mixing chamber includes an outer barrel, an inner barrel and an accelerating chamber. Low pressure air is supplied to the system by the blower assembly and mixed with particulate material. The air/material mixture is transported through the mixing chamber into the accelerating chamber and through the outlet conduit. In other embodiments, the particulate material is mixed with the air in the accelerating chamber. Other embodiments of the system include only the mixing chamber, where a flow of at least one flowable material in the form of high or low pressure gas, liquid, and/or particulates suspended within the gas or liquid enters either laterally or axially, forms boundary layer and laminar flows, and exits through the accelerating chamber.

6 Claims, 14 Drawing Sheets

U.S. PATENT DOCUMENTS

| | | | |
|---|---|---|---|
| 1,578,954 A | 3/1926 | Caracristi | |
| 1,614,713 A | 1/1927 | Caracristi | |
| 1,626,487 A | 4/1927 | Warren | |
| 1,755,779 A | 4/1930 | Goebels | |
| 1,769,197 A | 7/1930 | Wetmore | |
| 1,893,484 A | 1/1933 | Belt | |
| 2,000,953 A | 5/1935 | Hooker et al. | |
| 2,252,581 A | 8/1941 | Saint-Jacques | |
| 2,614,892 A | 10/1952 | Cherewick | |
| 2,784,948 A | 3/1957 | Pahl et al. | |
| 2,831,754 A | 4/1958 | Manka | |
| 2,912,942 A | 11/1959 | Whitney, Jr. et al. | |
| 3,118,286 A | 1/1964 | Schroeder | |
| 3,149,884 A | 9/1964 | Jones | |
| 3,182,675 A * | 5/1965 | Zilberfarb et. al. | 137/808 |
| 3,223,388 A | 12/1965 | Knox | |
| 3,301,605 A | 1/1967 | Greenway | |
| 3,311,234 A | 3/1967 | Rumpf et al. | |
| 3,370,890 A | 2/1968 | Morgan | |
| 3,377,107 A | 4/1968 | Hodgson et al. | |
| 3,389,938 A | 6/1968 | Frazier | |
| 3,506,024 A | 4/1970 | Erwin et al. | |
| 3,507,116 A | 4/1970 | Berry | |
| 3,602,552 A | 8/1971 | Morgan | |
| 3,618,398 A | 11/1971 | Posingies et al. | |
| 3,643,676 A | 2/1972 | Limage et al. | |
| 3,664,360 A | 5/1972 | Royle et al. | |
| 3,693,842 A | 9/1972 | Cozzarin et al. | |
| 3,708,239 A | 1/1973 | Stahle | |
| 3,794,299 A | 2/1974 | McCord et al. | |
| 3,970,547 A | 7/1976 | Theodore et al. | |
| 3,973,802 A | 8/1976 | Kwon et al. | |
| 3,975,058 A | 8/1976 | York | |
| 4,034,964 A | 7/1977 | Larson | |
| 4,053,141 A | 10/1977 | Gussefeld | |
| 4,054,507 A | 10/1977 | Pouska | |
| 4,057,399 A | 11/1977 | Cole et al. | |
| 4,088,449 A | 5/1978 | Smith | |
| 4,111,402 A | 9/1978 | Barbini | |
| 4,197,092 A | 4/1980 | Bretz | |
| 4,321,963 A | 3/1982 | Bowden | |
| 4,371,036 A | 2/1983 | Fordsmand | |
| 4,391,561 A | 7/1983 | Smith et al. | |
| 4,449,862 A | 5/1984 | Beck | |
| 4,451,184 A | 5/1984 | Mitchell | |
| 4,500,228 A | 2/1985 | McDonald et al. | |
| 4,515,252 A * | 5/1985 | Hidaka et al. | 188/282.5 |
| 4,684,296 A | 8/1987 | Horii et al. | |
| 4,711,607 A | 12/1987 | Wynosky et al. | |
| 4,851,110 A | 7/1989 | Rolle et al. | |
| 4,884,894 A | 12/1989 | Hashimoto et al. | |
| 4,893,672 A | 1/1990 | Bader | |
| 5,018,910 A | 5/1991 | Weiss | |
| 5,069,582 A | 12/1991 | Young | |
| 5,399,015 A | 3/1995 | Zhi-qiang et al. | |
| 5,426,137 A | 6/1995 | Allen | |
| 5,505,262 A * | 4/1996 | Cobb | 166/312 |
| 5,681,132 A | 10/1997 | Sheppard, Jr. | |
| 5,718,539 A | 2/1998 | Segota | |
| 5,827,909 A | 10/1998 | DesMarais | |
| 5,863,155 A | 1/1999 | Segota | |
| 6,024,874 A | 2/2000 | Lott | |
| 6,027,241 A | 2/2000 | King | |
| 6,089,795 A | 7/2000 | Booth | |
| 6,102,561 A | 8/2000 | King | |
| 6,155,751 A | 12/2000 | Lane et al. | |
| 6,217,261 B1 | 4/2001 | Santa Cruz et al. | |
| 6,419,843 B1 | 7/2002 | Natarius | |
| 6,632,370 B2 | 10/2003 | Natarius | |
| 6,659,118 B2 | 12/2003 | Lane et al. | |
| 2003/0102038 A1 | 6/2003 | Lane et al. | |

FOREIGN PATENT DOCUMENTS

| | | |
|---|---|---|
| EP | 0 841 085 A1 | 5/1998 |
| FR | 2 203 762 A | 5/1974 |
| WO | WO 97/25266 A | 7/1997 |

OTHER PUBLICATIONS

Supplementary European Search Report dated Apr. 21, 2005 for Application No. EP 02 78 9891, 4 sheets.

* cited by examiner

FLOW DEVELOPMENT CHAMBER

CROSS-REFERENCE TO RELATED APPLICATION(S)

This patent application is a divisional application of U.S. patent application Ser. No. 10/685,174, filed Oct. 14, 2003, now U.S. Pat. No. 7,066,207, which is a continuation of allowed application Ser. No. 10/011,493 filed Dec. 4, 2001, now U.S. Pat. No. 6,659,118, issued on Dec. 9, 2003, the disclosures of which are incorporated fully herein by reference.

FIELD OF THE INVENTION

This invention is directed to an apparatus and methods for conveying "flowable" materials through a conduit, such as, a pipe or hose, over long distances.

BACKGROUND OF THE DISCLOSURE

"Flowable" materials are those capable of flow movement, such as gases or a combination of gas and solids and/or liquids. Conveying systems for transporting flowable materials, such as pneumatic conveying systems, high and low pressure natural gas pipelines, flow lines, transmission lines, gathering systems, vapor recovery systems, coal bed methane gas lines, and liquid conduits, are known in the art, but all present problems when the materials are to be transported over large distances.

Pneumatic conveying systems for transporting material through a conduit have been in use for years and are well known in the art. Over the years the designs of these systems have changed to provide for greater efficiency in operational cost and labor. For instance, early systems utilized belt driven conveyors to transport materials from an input hopper to a mixing chamber. Unfortunately, these systems were inefficient in that the belt drives experienced many problems, such as wearing and breakage. Due, in part to problems experienced with belt systems, pneumatic conveying systems were developed.

Generally, pneumatic conveying systems include a feed mechanism, such as, an auger, for transporting the material to a mixing chamber. In the mixing chamber, the material is entrained in pressurized air which is supplied into the mixing chamber through jets or air inlets. In some systems, the material and air are mixed and accelerated in an accelerating device, such as, a venturi pipe, which is connected to the mixing chamber. The accelerated mixture is then transported out of the venturi pipe and into a conduit which conveys the materials to a specified destination. Typically, conventional pneumatic conveying systems can transport material up to about 1,000 feet. The limited distance the material can be conveyed is due, in part, to the operating pressure of the system and the instability of the material flow in the conduit.

Many other problems also exist with pneumatic conveying systems. For example, if excessive pressure builds up in the conduit, e.g., from a blockage in the conduit, gas and product back flow into the hopper. This back flow is known as "blowback". Further, as the material travels through the conveying conduit, in earlier designs, and current designs, it strikes the walls of the conduit. This not only damages the walls of the conduit, but damages the material as well. Thus, problems of erosion of equipment and attrition of product are also present. Finally, many current designs incur a high cost of operation due to the high requirement of energy input to operate the system.

Many pneumatic systems have been developed to address different problems. For instance, the blowback problem, among others, was addressed in the system described in U.S. Pat. No. 4,711,607 to Wynosky et al. In the Wynosky device, a rotating auger enclosed by a cylindrical barrel transports particulate material towards the discharge end of the barrel which resides within a plenum chamber. Pressurized gas is introduced into the plenum chamber for creating a gas flow in a venturi pipe, which is coupled at one end to the plenum chamber and at its other end to a conduit used to transport the material. Measurements of the pressure differential between the plenum chamber and the conduit are used to monitor potential blowback problems. Further, this system operates at lower operating pressures than most systems, e.g., 12-15 psi. Nonetheless, this system does not achieve a sufficiently stable flow of material through the conduit, which restricts the distance over which the material can be transported, including the ability to transport the material through elevational or directional changes.

U.S. Pat. No. 5,681,132 to Sheppard, Jr. describes an on-line pumping unit designed to extend transport distances. In Sheppard, the pumping unit includes a screw conveyor assembly coupled to a laminar flow, inductor assembly. In this system, the inductor assembly forms the core of a linear accelerator apparatus used to extend transport distances. Nonetheless, this system does not teach how material can be conveyed over very long distances, such as, for example, a mile.

Known natural gas conveying systems, pipelines, transmission lines, and gathering systems have similar problems. Gas is conveyed through the natural gas flow line in mid- and high-pressure systems in a turbulent flow. Turbulent flow results in friction loss and energy inefficiency, resulting in increased pressure drop. Therefore, higher pressure, increased compressor size, and increased pipeline capacity is needed to push the quantity of gas through the long distance.

Fluids frequently accumulate in low points of the flow line in high, mid and low pressure systems and these low points therefore sometimes have significantly higher pressure than other portions, resulting in erratic gas production. To alleviate this problem in larger lines, a "pig" is used as a scrubber that can push the liquids down to another part of the line where the pig is retrieved along with the liquid. In smaller lines, the production is halted for periods of time to increase the formation pressure to move the accumulated fluids from the low points in the line. Additionally, in down-hole gas wells with accumulated fluids, plungers are traditionally used to convey the accumulated fluids to the surface, which is time-consuming and costly. The increase of accumulated fluids over time and breaks in production lead to lower overall gas production, inefficiencies and higher maintenance and production downtime. The fluids may also freeze in winter, causing plugging of the line and lost gas production.

Liquid is also typically conveyed in a turbulent flow, which leads to both energy inefficiencies and damage to the conduit, as described above. Additionally, non-turbulent flow of material can become turbulent over long distances, and flow-changing devices cannot be easily installed in an existing casing.

As shown from above, a need exists in the art for a system that requires low energy input in particulates conveying, reduces equipment wear, reduces product degradation and can transport materials for long distances, such as a mile and over. Further, a need exists for a system that can convey materials through dramatic high angle and vertical elevation and sharp directional changes. A need also exists for a system that can convey materials without plugging, and can further classify and mechanically dry materials during processing. A need exists to alleviate pressure in lines due to accumulated fluids. A need also exists in the art for a conveying system that can be easily installed within an existing casing in oil and gas production lines.

SUMMARY OF THE DISCLOSURE

The instant invention is directed to a material handling system for developing a strong laminar flow of flowable material surrounded by a boundary layer flow of the same or different flowable material, such that long transport distances through dramatic elevation and directional changes can be achieved. The boundary layer flow protects the walls of the conducting conduit from assault by the conveyed material, thereby protecting both the walls of the conduit and the conveyed material. Further, this system can utilize low pressure to initiate the conduction of material, thereby dramatically reducing the operational costs of this system. This system can also operate in high pressure such as, for example, natural gas conveyance at up to and above 1,500 psi. However, this system can equally operate in low pressure gas wells and pipelines, including coal bed methane wells.

One embodiment of the instant invention includes a blower assembly, an inlet and an outlet conduit. The blower assembly supplies low pressure air to the system through the inlet, which in some preferred embodiments receives both air and the particulate material to be conveyed. The inlet is coupled to the flow developing device such that the air from the blower assembly passes into the mixing chamber.

The mixing chamber includes an outer barrel, an inner barrel and an accelerating chamber, wherein the inner barrel is disposed within the outer barrel and wherein the outer barrel is coupled to the accelerating chamber. The inner barrel of the mixing chamber can be either solid or hollow depending upon how materials are to be transported into the system. If materials are to be transported into the system entrained in air, then a solid or capped inner barrel is generally used. If materials are to be transported by an auger or screw type conveyor, then a hollow inner barrel may be utilized and the auger or screw placed within the hollow inner barrel.

Typically, the air from the blower is passed tangentially over the inlet such that the air, or air and material mixture, sets up a flow pattern that circulates and traverses the inner barrel towards the accelerating chamber. Once in the accelerating chamber, a vortex flow is developed. As the flow moves through the accelerating chamber, the flow accelerates and a boundary layer flow begins to develop. The flow mixture then travels out of the accelerating chamber into the outlet conduit which is coupled to the accelerating chamber. As the air/material mixture travels down the outlet conduit, the vortex flow transforms into a laminar flow surrounded by the boundary layer flow. The mixture is then transported the length of the outlet conduit until it reaches its destination.

In operation, this embodiment operates at pressures between 1-9 psi. One advantage of this lower pressure is that the operational costs are substantially reduced. A further advantage includes the reduction or substantial elimination of blowback problems.

In another embodiment of the instant invention, only the mixing chamber is used. Flowable materials flow into the inlet opening of the mixing chamber and set up the flow pattern, as described above. In operation, laminar and boundary layer flows are developed at low pressures, such as 1-10 psi, as well as high pressures, such as over 1,500 psi. Such high pressure systems are common in natural gas conveying lines.

In another embodiment, the inlet opening in the mixing chamber is configured so as to allow the material to enter the mixing chamber axially. Flow deflecting means is configured near the opening to deflect the incoming material into the circulating flow traversing the inner barrel, as described above. This embodiment can develop laminar and boundary layer flows from a turbulent flow, or can be used to restore an already existing substantially laminar flow.

Axial material entry is advantageous for inserting the mixing chamber into, for example, the tubing of an oil or gas well, where there may not be enough room in the existing casing to fit extra tubing for lateral entry. Axial entry mixing chambers can be attached between two segments of tubing or fitted inside existing tubing.

Additional embodiments of the instant invention are capable of transporting material flows through dramatic elevation and directional changes. One advantage of this feature is that the system can be utilized in various types of space and over varying terrain.

Embodiments of this system can be scaled to varying sizes. Advantages of varying sizes of this system include the ability to build a system in virtually any size space and allows users to more appropriately meet their needs, e.g., lower costs, lower production requirements and lower maintenance costs.

The material input into embodiments of this system are transported down the conduit pipe in a laminar flow surrounded by a boundary layer flow. An advantage of the boundary layer flow is that it protects the conduit pipe from material as it passes down the pipe and further protects the material that is being transported.

Due to high air to particle ratio in the material flow, the system can be shut down and restarted without the need to clear the lines, thereby gaining an advantage of eliminating costly maintenance and line plugging associated with traditional technologies.

Additionally, embodiments of this system do not emit combustion or chemical pollutants. At least one advantage of this feature is that the system does not adversely affect the environment.

Further, materials transported down the conduit are mechanically, not thermally dried of surface moisture. This provides the advantage of eliminating explosion hazards associated with current thermal dryers. It also surface dries materials at considerable lower energy costs than thermal dryers.

Other embodiments of the instant invention can separate different types of materials within the flow, due to the mechanics of the boundary layer and laminar flows. Accumulated water in natural gas flow lines, for instance, can be separated from the natural gas flow into the boundary layer and drained. This can increase gas production and reduce high pressure areas in the line. This can also reduce "plugging" of the line due to freezing condensates. Also, flows that contain several different types of flowable materials, such as, for example, from a stripper oil well containing a mixture of oil, gas, condensate and water, can be separated by mass and/or form and collected with a separator tank.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION

Figure 1:
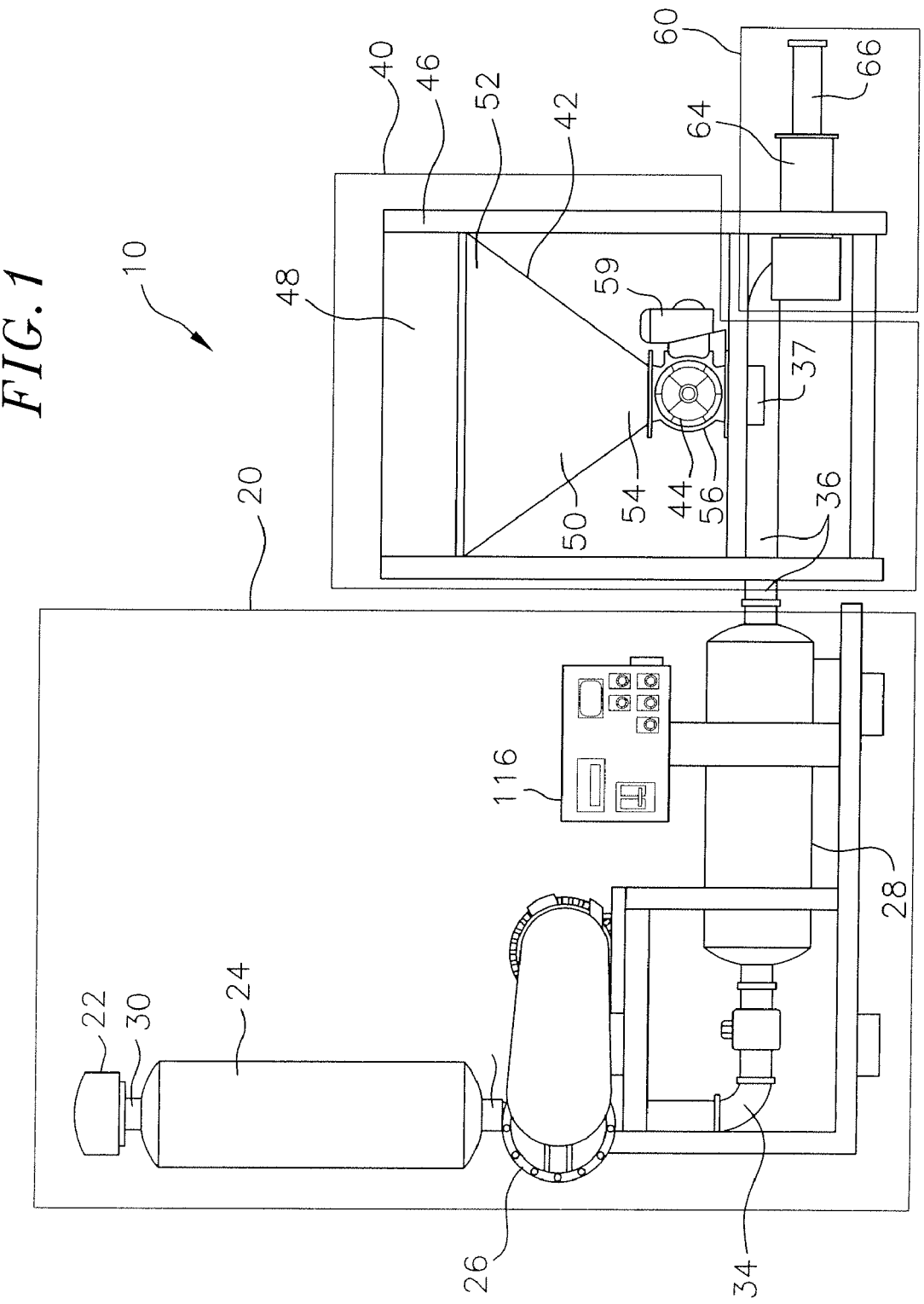
FIG. 1 is a schematic of an embodiment of a material conveying system embodying features of the present invention.

An embodiment of the instant invention is directed to an apparatus and a method for pneumatically conveying flowable material through a conduit over long distances, such as, for example, a mile, and through elevation and directional changes. In some embodiments the system further mechanically dewaters and/or classifies the material by mass. With reference to FIG. 1, an embodiment of an overall pneumatic material handling system 10 includes an air delivery system 20, a material delivery system 40 and a mixing system 60. The air delivery system 20 includes an air filter 22, an inlet silencer 24, a blower assembly 26, an outlet silencer 28 and a plurality of coupling pipes 30, 32, 34 and 36. The blower assembly 26 draws in air through the inlet filter 22 from the environment and filters out contaminants and other particulates. Inlet filters 22 are well known in the art and manufactured, for example, by Nelson Industries under the Universal Silencer name. Depending upon the environmental conditions, some preferred embodiments do not require inlet filters as the air does not require filtering.

The inlet filter 22 is connected by coupling pipe 30 to the inlet silencer 24 which includes a cylindrical body having a first end and a second end. The first end and the second end each include openings for passing air into and out of the silencer 26. Silencers are also well known in the art and are manufactured, for example, by Nelson Industries under the Universal Silencer name.

The inlet silencer 24 is connected by coupling pipe 32 to the blower assembly 26, which is any air blowing device that is capable of delivering low pressure air to the system. The blower assembly 26 includes an inlet and outlet, wherein incoming air enters the blower assembly 26 through the inlet and passes out of the blower assembly 26 through the outlet. In preferred embodiments, a positive displacement blower generating air having a pressure capability of up to 12 psi may be used. In one preferred embodiment, a Sutorbilt positive displacement blower, manufactured by Gardner Denver may be used.

The blower assembly 26 is connected by coupling pipe 34 to the outlet silencer 28.

Similar to the inlet silencer 24, the outlet silencer 28 includes a cylindrical body having a first end and a second end, wherein the first end and the second end each include openings for passing air into and out of the outlet silencer 28. Both the inlet and outlet silencers 24, 28 are used to reduce excessive noise generated by the blower assembly 26. If noise is not a consideration, then inlet or outlet silencers are not necessary.

The coupling pipe 36 is connected to the second end of the outlet silencer 28 and extends towards the mixing system 60. In preferred embodiments, the coupling pipe 36 has an opening 37 for receiving material from the material delivery system 40 as described below.

The material delivery system 40 preferably includes a hopper 42, a rotary feeder 44 and a frame 46. The hopper 42 includes an open end 48 and a chute 50. The open end 48 of the hopper 42 accepts incoming material to be processed, such as, for example, coal or rubber. Typically, the open end 48 is large enough to accept large quantities of materials of varying sizes. In one preferred embodiment, the open end 48 is rectangular in shape, although any shape capable of accepting incoming material is suitable.

The chute 50 of the hopper 42 is funnel shaped having a first end 52 and a second end 54. The first end 52 of the chute 50 resides adjacent the open end 48 of the hopper 48 such that material falls into the portion of the chute 50 having the largest diameter. The open end 48 and the chute 50 can be manufactured as a single piece or can be separately manufactured and coupled together, such as, for example, by welding. In preferred embodiments, the hopper 42 is made from materials, such as, but not limited to, steel, aluminum or metal alloys, although any material capable of accepting large quantities of materials is suitable.

Figure 7:
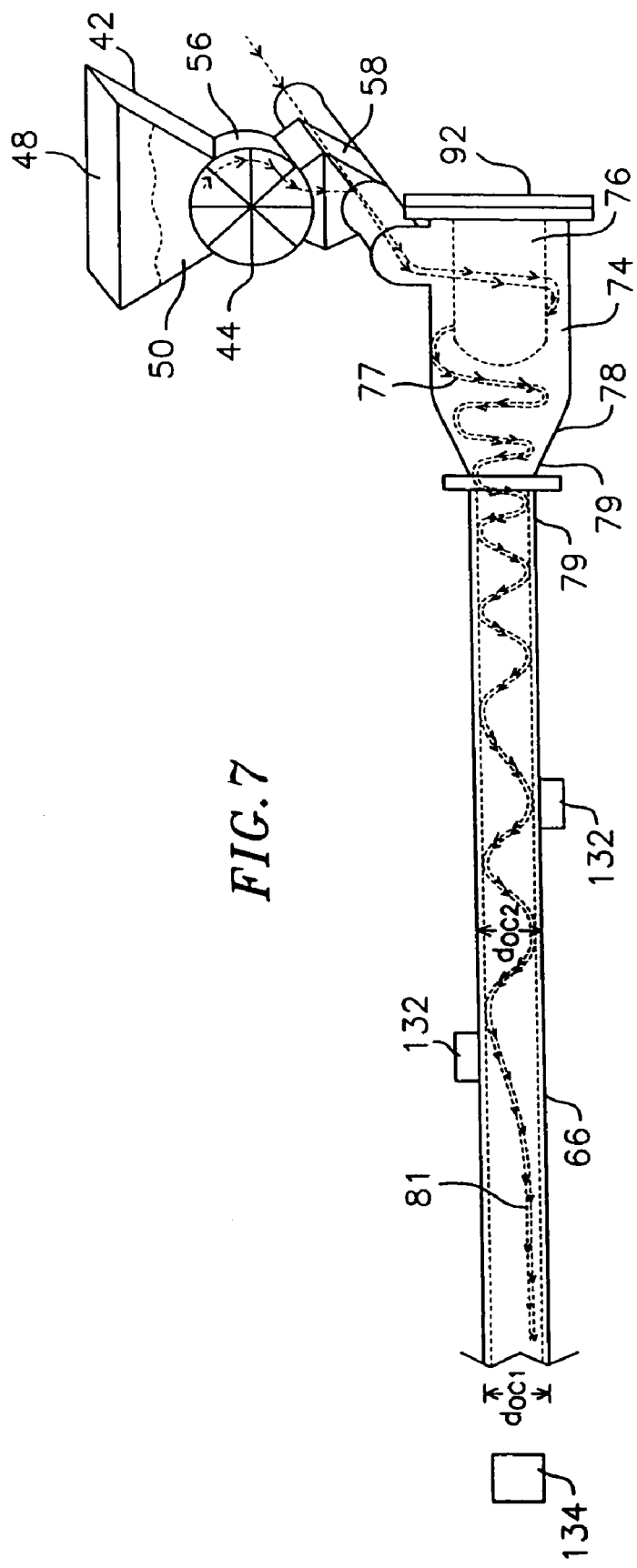
FIG. 7 is a schematic of another embodiment of a material conveying system utilizing a solid inner barrel and illustrating the flow paths of the air and material.

The rotary feeder 44 includes a chamber 56 having a rotor, a dispensing chute 58 and a motor 59. The chamber 56 is a hollow barrel, wherein the interior of the barrel is separated into segments by radial spokes. The chamber 56 further includes a top openings and a bottom opening. The top opening of the chamber 56 is coupled to and communicates with the second end 54 of the hopper 42. With reference also to FIG. 7, the dispensing chute 58 has an outlet disposed over the opening 37 of the coupling pipe 36 such that material flowing through the dispensing chute 58 enters the coupling pipe 36.

The motor 59 resides adjacent the rotary feeder 44 and causes the rotor to rotate. The motor 59 is any suitable device for driving the rotary feeder 44 and may be electrically driven or generator operated. Rotary feeders are well known in the art and are manufactured, for example, by Bush & Wilton Valves, Inc. Some preferred embodiments do not require a rotary feeder 44.

The frame 46 provides support to the hopper 42 and rotary feeder 44. The frame includes a plurality of legs, wherein the open end 48 of the hopper 42 is coupled to the legs, such as, for example, by welding. Some preferred embodiments do not require a frame 46.

With reference to FIGS. 2, 3a, 3b and 4, the mixing system 60 includes an inlet conduit 62, a mixing chamber 64 and an outlet conduit 66. Preferably, the inlet conduit 62 is a pipe, although any conduit, such as, for example, a hose, which is capable of receiving air and/or material is suitable. The inlet conduit 62 should preferably be capable of receiving large amounts of particulate material at high rates. For instance, in one preferred embodiment, the inlet conduit 62 is capable of receiving material up to 3" in diameter at a rate of 500 tons/hour. For greater volumes, multiple systems can be used.

Figure 3A:
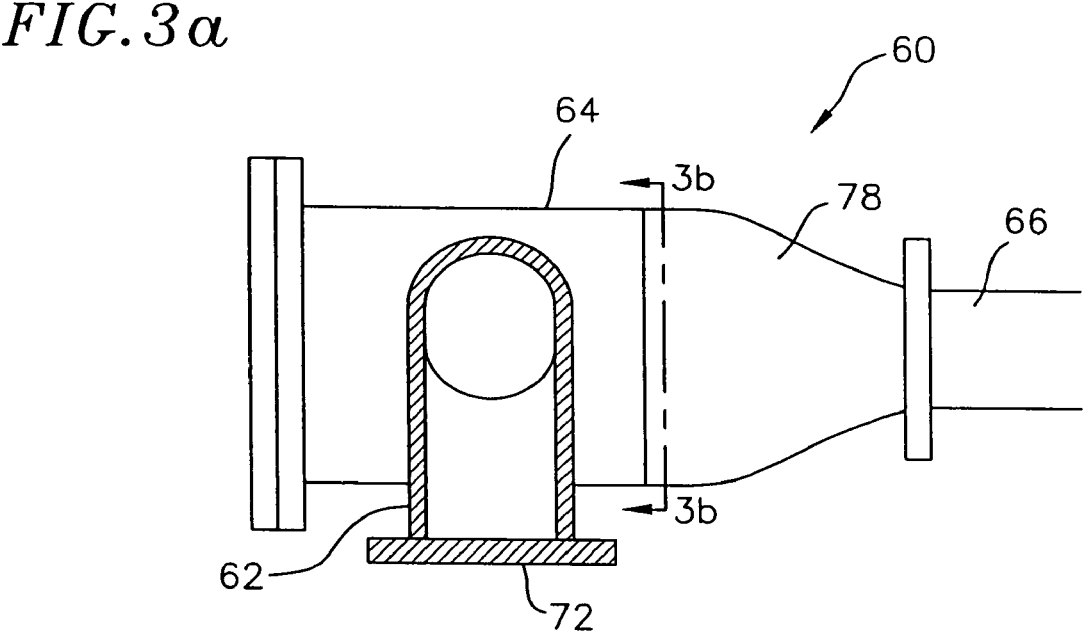
FIG. 3a is a plan view of an embodiment of a cross section of the inlet coupled to the outer barrel of the material conveying system of FIG. 1.
Figure 3B:
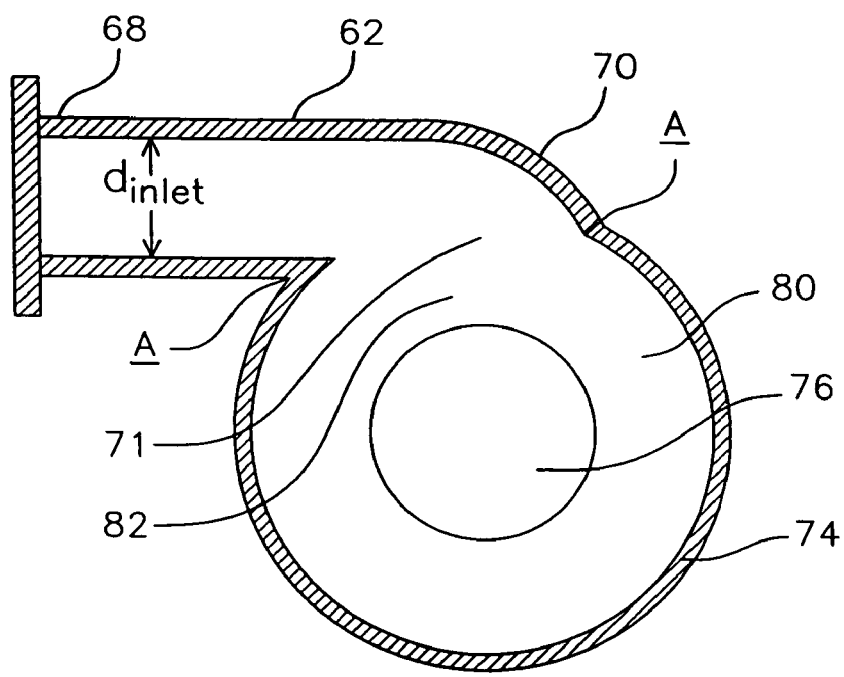
FIG. 3b is a side cross section of the inlet in FIG. 3a coupled to the outer barrel.

As shown in FIG. 3b, the inlet conduit 62 includes a first end 68, a second end 70 and a coupling flange 72, wherein both the first end 68 and the second end 70 are open. Preferably, the diameter $d_{inlet}$ of the inlet conduit 62 is substantially constant throughout the distance between the first end 68 and a point A at which the inlet conduit 62 couples to the mixing chamber 64. Preferred embodiments typically have diameter sizes of 2", 4", 6", 8", 10", 12" and 18" as it has been found that most materials with diameter sizes up to 5" can pass through inlets having these size diameters.

The coupling flange 72 extends radially outward from the first end 68 of the inlet conduit 62 and has a plurality of openings 73 for receiving fasteners. The coupling flange 72 is coupled to the second end of the coupling pipe 36 such that the inlet conduit 62 is in fluid communication with the coupling pipe 36 and can receive incoming air and particulates.

Typically, the inlet conduit 62 is cylindrical in shape, although any shape, such as, for example, a rectangle or octagon, which is capable of passing air and material is suitable. In preferred embodiments, the inlet conduit 62 is made from durable materials, such as, for example, aluminum, metal alloys or steel, although any material capable of contacting a wide variety of materials without sustaining substantial damage is suitable.

Figure 4:
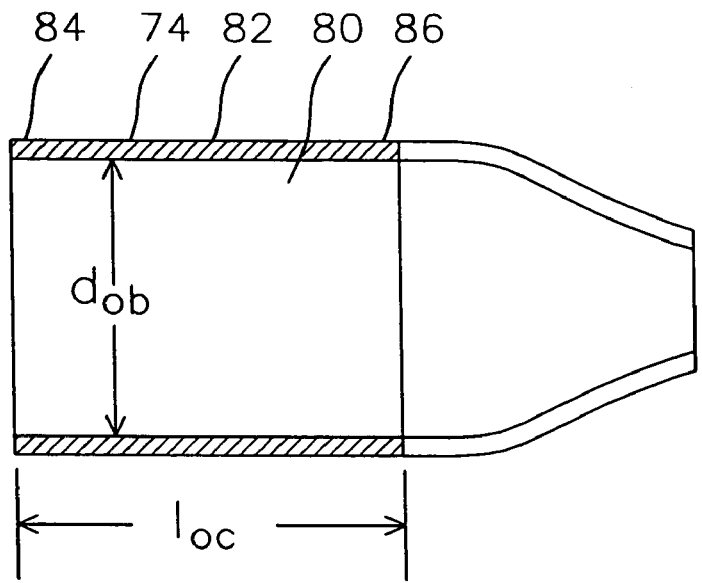
FIG. 4 is an embodiment of the outer barrel of the material conveying system of FIG. 1.

The mixing chamber 64 further includes an outer barrel 74, an inner barrel 76 and an accelerating chamber 78. With reference also to FIG. 4, the outer barrel 74 includes a hollow interior 80 having an inner diameter $d_{ob}$, an opening 71 (see FIG. 3b), a first end 84 and a second end 86.

The hollow interior 80 is capable of receiving air and material. The second end 71 of the inlet conduit 62 (FIG. 3b) is coupled around the opening 70 such that the hollow interior 80 of the mixing chamber 64 (FIG. 4) is in fluid communication with the inlet conduit 62 of FIG. 3b.

Typically, the outer barrel 74 is cylindrical in shape. In preferred embodiments, the outer barrel 74 is made from durable materials, such as, for example, aluminum, metal alloys or steel, although any material capable of contacting a wide variety of materials without incurring substantial damage is suitable.

Figure 2:
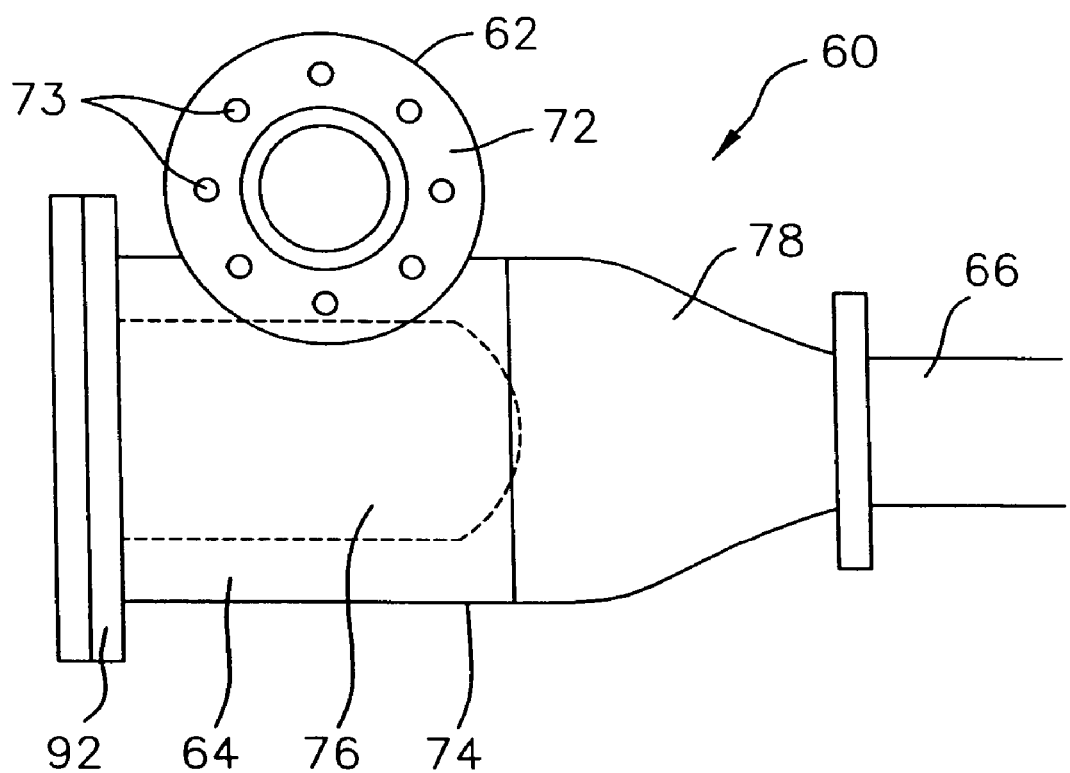
FIG. 2 is a top view of an embodiment of the mixing chamber and an inlet of the material conveying system of FIG. 1.
Figure 5:
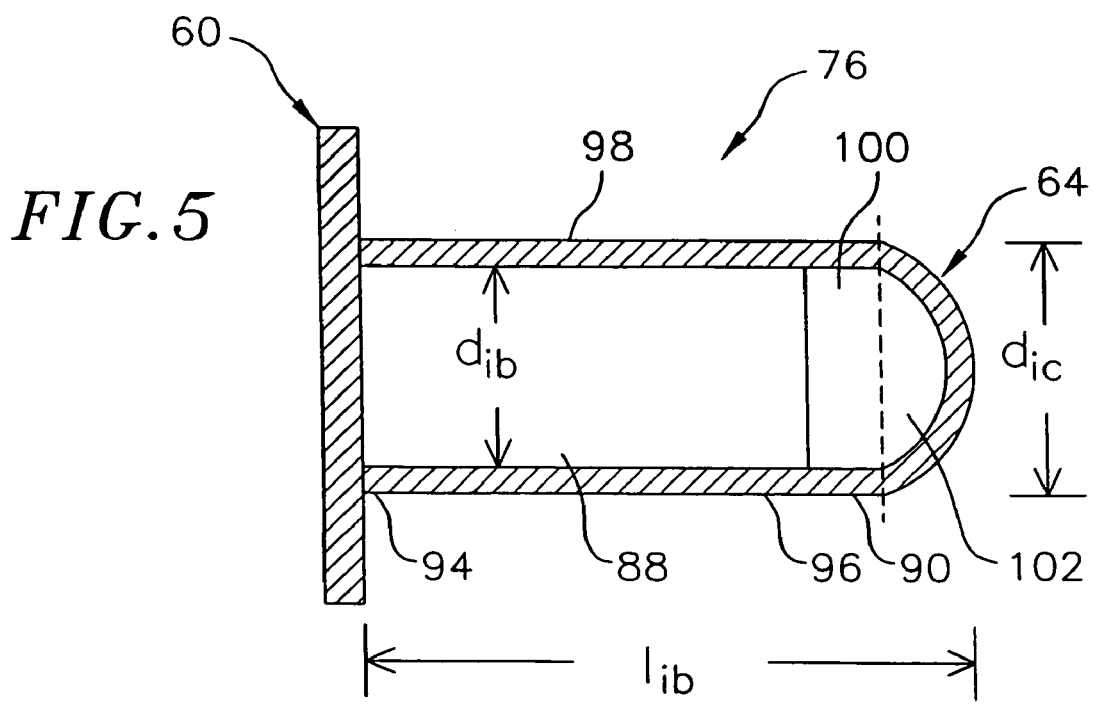
FIG. 5 is a cross section of an embodiment of a solid inner barrel of the material conveying system of FIG. 1.

With reference also to FIG. 5, the inner barrel 76 includes a first member 88, a second member 90 and a mounting flange 92. The first member 88 includes a first end 94, a second end 96 and an outer surface 98. The inner barrel 76 is disposed within the hollow interior 80 of the outer barrel 74 (FIG. 2). In one preferred embodiment, the inner barrel 76 is solid. In other preferred embodiments, described below, the inner barrel 76 is hollow.

Preferably, the first member 88 (FIG. 5) is cylindrical in shape. Further, the diameter $di_b$ of the first member 88 is preferably constant between the first end 94 and the second end 96.

The mounting flange 92 is a plate of any shape, such as, for example, a disk or rectangular element which is coupled to the first end 94 of the first member 88. In some preferred embodiments, the mounting flange 92 and the first member 88 are formed as a single piece. The mounting flange 92 also connects to the first end 84 of the outer barrel 74.

The second member 90 of the inner barrel 76 includes a cylindrical section 100 and a hemispherical end portion 102. The cylindrical section 100 is coupled to the second end 96 of the first member 88.

The hemispherical end portion 102 resides adjacent the cylindrical section 100. In some preferred embodiments, the hemispherical end portion 102 and the cylindrical section 100 are formed as a single element. Although this preferred embodiment depicts a hemispherically shaped end portion, any geometry from a flat plate to a hemispherically shaped cap is suitable. Typically, the radius of the hemispherical end portion 102 is substantially equivalent to the radius of the first member 88 and the cylindrical section 100 (FIG. 5 not drawn to scale).

Preferred embodiments of the inner barrel 76 are made from materials, such as, but not limited to, steel, metal alloys and aluminum. However, any material capable of contacting a wide variety of materials without incurring substantial damage is suitable.

Figure 6:
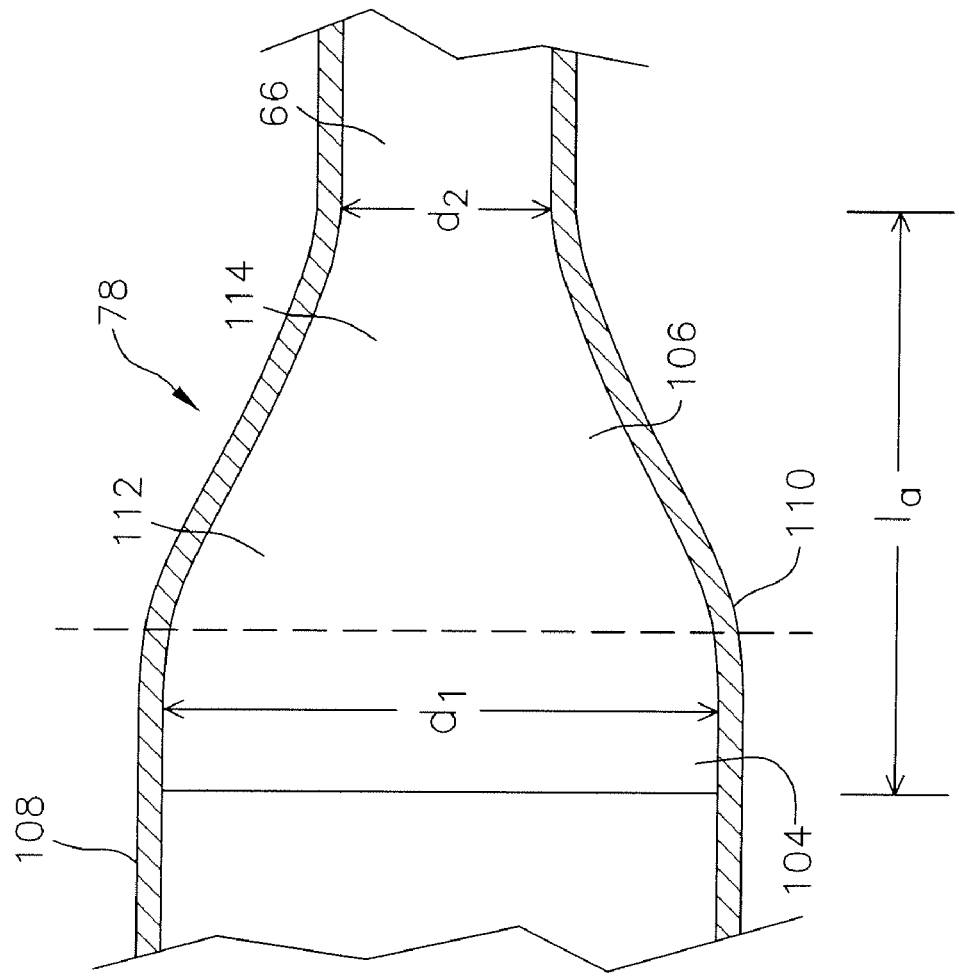
FIG. 6 is a cross section of an embodiment of an accelerating chamber of the material conveying system of FIG. 1.

With reference also to FIG. 6, the accelerating chamber 78 includes an outer cylindrical section 104 and a conical section 106. The outer cylindrical section 104 includes a first end 108 and a second end 110, wherein the diameter $d_1$ is preferably constant between the first end 108 and the second end 110. The first end 108 of the outer cylindrical section 104 of the accelerating chamber 78 is coupled to the second end 86 of the outer barrel 74.

The conical section 106 includes a first end 112 and a second end 114, wherein the first end 112 is coupled to the second end 110 of the cylindrical section 104. The diameter between the first end 112 and the second end 114 of the conical section decreases in size from the first end 112 to the second end 114. In one preferred embodiment, the conical section 106 is a standard concentric pipe reducer. In another embodiment, the accelerating chamber 78 does not include the cylindrical section 104, rather, the accelerating chamber is a cone, such as, for example, a flat rolled cone, preferably having an angle of about 30-55 degrees.

With reference to FIGS. 6 and 7, the outlet conduit 66 is a process pipe having an outside diameter $d_{oc1}$ and an inside diameter $d_{oc2}$ for conveying material to a predetermined destination. The outlet conduit 66 is coupled to the second end 114 of the conical section 106 of the accelerating chamber 78 such that the material and air mixture is passed from the accelerating chamber 78 into the outlet conduit 66. The outlet conduit 66 can extend for long distances, such as for example, greater than 1 mile.

Referencing FIGS. 1 and 7, in operation, the blower assembly 26 is turned on and air is drawn into the inlet filter 22. The air is cleaned of particulates and passes into the inlet silencer 24. The air passes through the inlet silencer 24 and enters the blower assembly 26. The blower assembly 26 passes air having up to 12 psi into the outlet silencer 28. As stated above, the inlet and outlet silencers reduce the amount of noise generated by the blower assembly 26. After the air passes through the outlet silencer 28, it exits into coupling pipe 36 and travels past the material delivery system 40.

Either before, after or during the time that the air delivery system 20 has begun operation, material is input into the open end 48 of the hopper 42 or other feeder device. The material passes through the open end 48 and into the chute 50 wherein the material may accumulate until fed out by the rotary feeder 44.

The rotary feeder 44 turns at a predetermined rate such that only specified quantities of material are released from the feeder 44. The material drops through the dispensing chute 58 and through the opening in the coupling pipe 36.

Figure 8A:
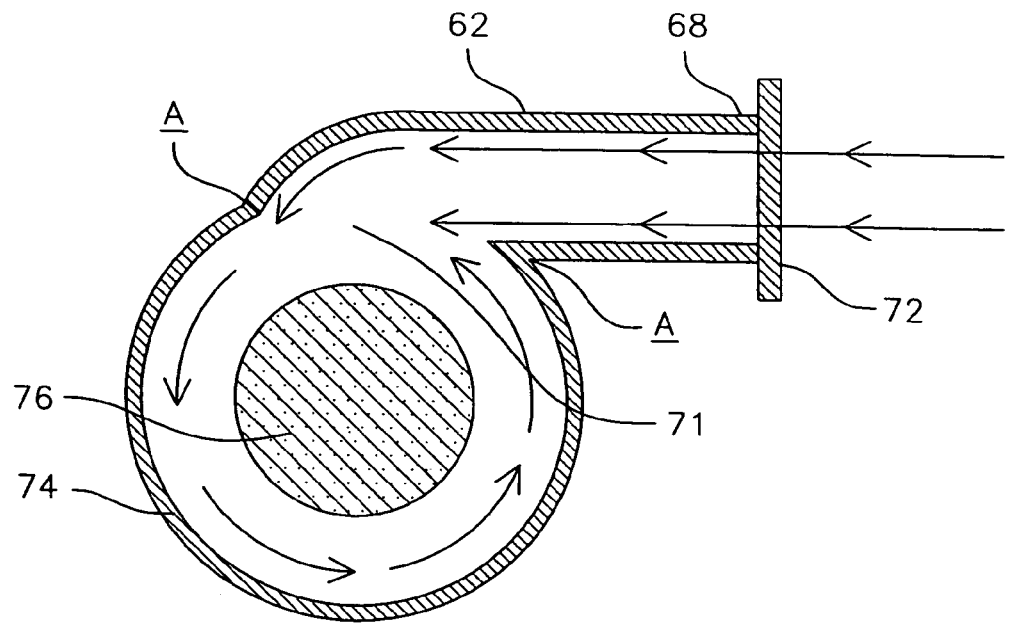
FIG. 8a is an embodiment of a counterclockwise rotating air flow path through the outer barrel of FIG. 4.
Figure 8B:
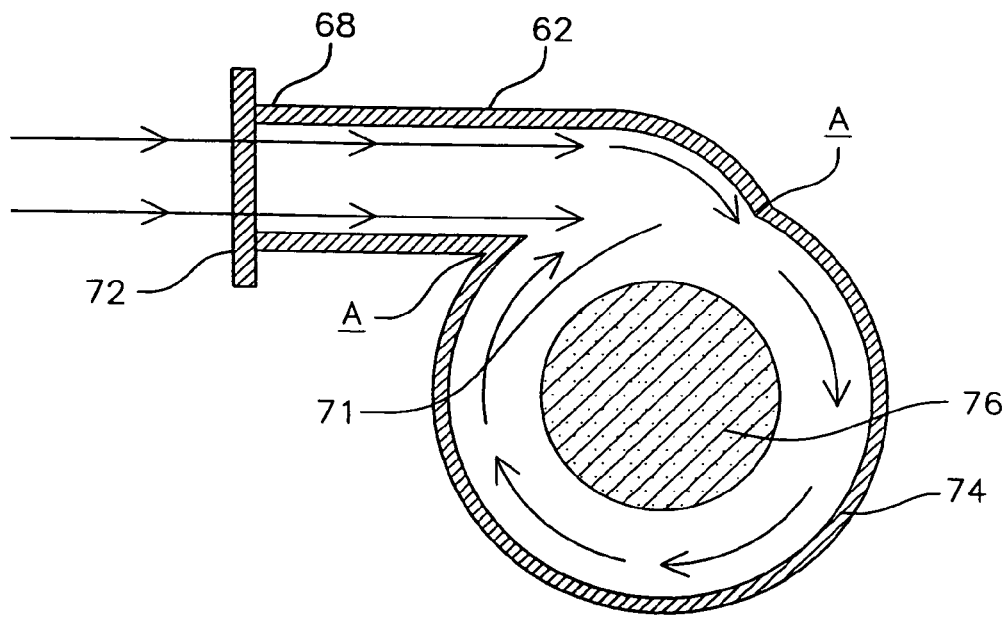
FIG. 8b is an embodiment of a clockwise rotating air flow path through the outer barrel of FIG. 4.

As air passes through the coupling pipe 36, it picks up the material and entrains the material in the air flow. The material and air continue through the coupling pipe 36 and enter the first end 68 of the inlet conduit 62. With reference also to FIG. 8a, after entering the inlet conduit 62, the material/air mixture preferably flows around the inner surface of the outer barrel 74. This is in contrast to the turbulent flows created in current pneumatic systems. It is believed that the tangential input of the air/material mixture along the interior of the outer barrel 74 leads to the development of the steady counterclockwise flow (when viewed from the back of the chamber) of the mixture in the outer barrel 74. With reference to FIG. 8b, in other preferred embodiments, the inlet conduit 62 may be mounted to the opposite side of the outer barrel 74 such that the air/material mixture flows in a clockwise direction in systems in use below the equator due to the Coriolis effect. The counterclockwise flow is preferred north of the equator due to the fact that a natural vortex rotates counterclockwise. However, clockwise rotations can also be established north of the equator.

As more air and material flows into the mixing chamber 64, the air/material mixture traverses the length of the inner barrel 76 while flowing counterclockwise around its outer surface 98 until it reaches the hemispherical end portion 102 in FIG. 5.

After passing over the hemispherical end portion 66 the air/material flow preferably forms a vortex 77, which is a combination of a sink flow and an irrotational vortex flow, and is accelerated through the accelerating chamber 78 (FIG. 7). As the flow traverses the length of the accelerating chamber 78, Taylor vortices, in the form of a boundary layer flow 79 of air, begins to form along the inner surface of the accelerating chamber 78 such that the forming boundary layer flow 79 surrounds the vortex flow 77. Typically, the boundary layer flow is 0.125"-0.25" thick. Generally, no material is found in the boundary layer flow 79, however, moisture is typically found in the boundary layer.

The vortex flow 77 and forming boundary layer flow 79 exit the accelerating chamber 78 through the second end 114 of the conical section 106 and enter the outlet conduit 66. As the flows 77, 79 exit the accelerating chamber 78, the boundary layer flow 79 is about substantially formed and traverses down the outlet conduit 66 at velocities of about less than 5 mph. The air flowing in the boundary layer 79 preferably circulates around the inner circumference of the outlet conduit 66.

The vortex 77 continues to travel for about 10-60 feet within the outlet conduit 66 prior to a laminar flow 81 forming. The length of the vortex can vary with the volume of air or product mass. In contrast to the slow moving boundary layer flow 79, the air in the laminar flow 81 is moving at velocities of about 50-60 mph. The material, which is traveling within the laminar flow 81, can travel at velocities of about 100 mph. Further, the denser material is traveling in the center of the laminar flow 81 while progressively less dense material travels in the outer portion of the laminar flow 81. As previously mentioned, moisture travels closest to, or in, the boundary layer flow 79.

In addition to the features discussed above, some preferred embodiments of the instant invention further include a controller 116 (see FIG. 1). In some preferred embodiments, the controller 116 is a computer, such as, for example, a personal computer, although any device capable of regulating the amount of air and material input into the system is suitable. To control the amount of air input into the system, some controllers include a variable frequency drive (not shown) which helps to automatically regulate the air flow for a given material. Other controllers allow manual regulation by the user or allow the system parameters to be set to deliver a constant flow.

In addition to regulating the amount of air input, the controller 116 may regulate the speed of the rotor which feeds material into the system. Typically, an optimal ratio exists between the type of material to be input and the amount of air required for a suitable air/material ratio such that a stable flow of material can be created to transport the material. For instance, for coal, the optimal ratio of air to coal is 1.75 to 1.0 volume of air to weight of coal.

Other preferred embodiments, also include a moisture collection system 132 and a decelerator 134. With reference to FIG. 7, the moisture collection system 132 is a vacuum system coupled to the outlet conduit 66 at various locations. The moisture collection 132 system pulls moisture off of the boundary layer flow 79 as it travels down the outlet conduit 66. Cyclones can also be used to remove the moisture in other preferred embodiments.

The decelerator 134 slows down the material which is moving through the outlet conduit 66. The decelerator 134 is either a collection bin or a cyclone system. Cyclones are well known in the art and are manufactured by, for example, Fisher-Klosderman, Inc.

In some preferred embodiments, the sizing of the various elements are specifically related to each other. It will be appreciated that this is not intended to restrict the sizing of any of the elements, but rather to illustrate relationships between elements found in some preferred embodiments.

In one preferred embodiment, many of the elements are sized with respect to the diameter of the outlet conduit. Preferably, the diameter dinlet of the inlet conduit 62 is substantially equivalent to the inner diameter $d_{oc2}$ of the outlet conduit 66. This equivalency in diameters increases the likelihood that materials passing into the system are capable of passing out of the system. The precise diameter of the inlet conduit 68 is, in part, determined based upon the type of material and the rate of material to be input. For instance, materials such as, for example, coal or rubber, less than 1" in size preferably require an inlet diameter of 4" for an input rate of 5 tons/hour.

Regarding the outer barrel 74, the inner diameter of the hollow interior 80 of the outer barrel 74 ranges from about 1.5 to 2.5 times the size of the inner diameter $d_{oc2}$ of the outlet conduit 66. In one preferred embodiment, the inner diameter of the hollow interior 80 is, for example, 8", which is 2.0 times as large as the inner diameter of the outlet conduit 66.

Similar to the outer barrel proportions, the outer diameter $d_{ib}$ of the inner barrel 76 ranges from about 1.0 to 1.5 times the size of the inner diameter of the outlet conduit 66. In one preferred embodiment, the outer diameter of the inner barrel 76 is 5", which is 1.25 times the size of the inner diameter of the outlet conduit 66.

With respect to the accelerating chamber 78, the diameter at the first end $d_1$ (FIG. 6) is equal to the diameter $d_{ob}$ of the outer barrel 74. The diameter of the second end 114 of the conical section 106 is substantially equivalent to the inner diameter of the outlet conduit 66. The length of the conical section 4 is preferably about 1.5 to 2.5 times the inner diameter at the outlet conduit 66. In one preferred embodiment, the length of the conical section 106 is about 8", which is about 2.0 times the size of the inner diameter of the outlet conduit 66.

The diameters of the various elements are not the only proportionally sized aspects of features of preferred embodiments. For instance, the length of the outer barrel 74 preferably ranges from about 2.0 to 4.5 times the size of the outer diameter $d_{oc1}$ of the outlet conduit 66. Further, the opening 82 in the outer barrel 74 which couples to the second end 70 of the inlet conduit 62, is typically 1.5 times the cross-sectional area of the inlet conduit 62 (see FIG. 3b). This allows for faster transport of material into the hollow interior 80 of the outer barrel 74.

Regarding the inner barrel 76, the length $l_{ic}$ of the inner barrel 76 is slightly longer than the length of the outer barrel 74. In preferred embodiments, the inner barrel 76 is longer by about 0.25" to 0.5". In one preferred embodiment, the length of the inner barrel 76 is 0.25" longer than the length of the outer chamber 44, specifically, the length is 12.25".

Figure 10:
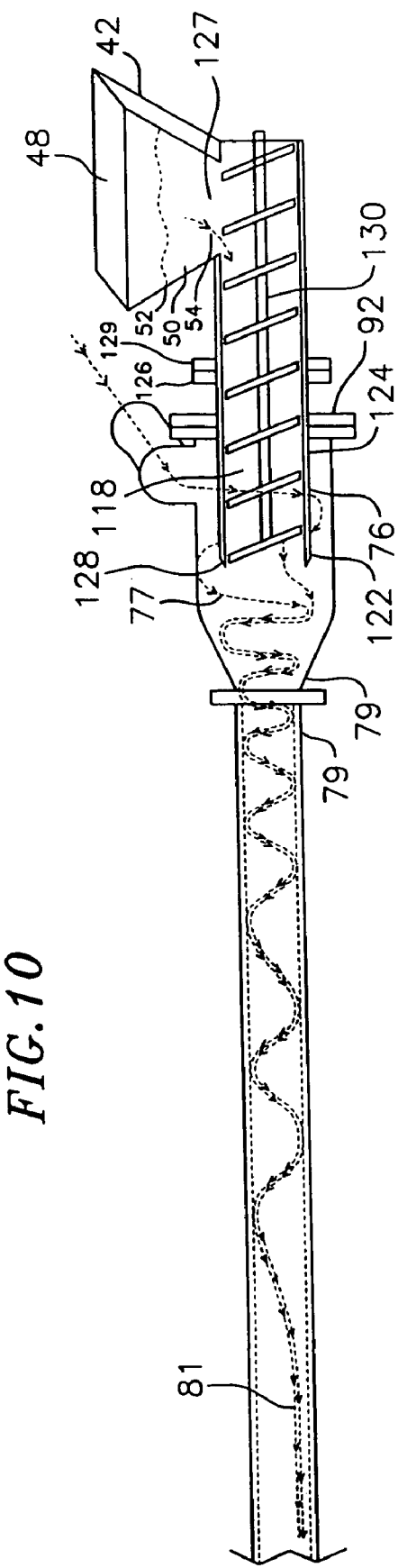
FIG. 10 is a schematic of another embodiment of a material conveying system utilizing an auger within a hollow inner barrel and illustrating the flow paths of the air and material.

With respect to FIG. 10, an alternative embodiment of the instant invention includes an air delivery system 20, a material delivery system 40 and a mixing system 60. Reference is made to the discussions above regarding the air delivery system 20.

In this preferred embodiment, the material delivery system 40 includes a hopper 42, wherein the hopper 42 includes an open end 48 and a chute 50. Reference is made to the discussions above regarding the open end 48 and the chute 50.

The mixing system 60 includes an inlet conduit 62, a mixing chamber 64 and an outlet conduit 66. Reference is made to the discussions above regarding the inlet conduit 62 and the outlet conduit 66.

The mixing chamber 64 further includes an outer barrel 74, an inner barrel 76 and an accelerating chamber 78, wherein the outer barrel 74 and accelerating chamber 78 have been previously discussed.

Figure 9:
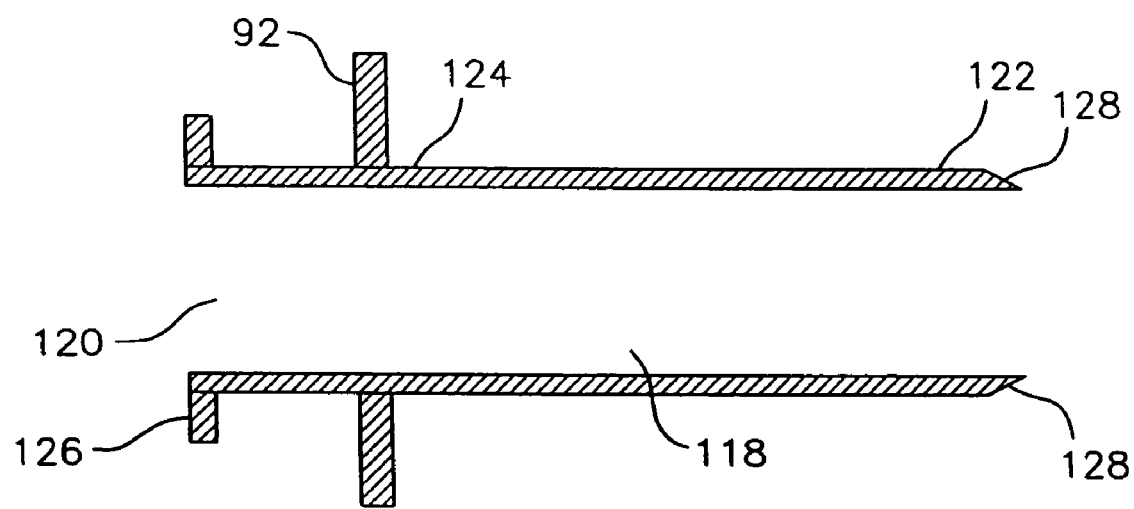
FIG. 9 is a cross section of an embodiment of a hollow inner barrel of the material conveying system.

Also with reference to FIG. 9, the inner barrel 76 includes a hollow interior 118, a first end 120, a second end 122, a coupling position 124, and a mounting flange 92. The first end 120 of the inner barrel 76 is open and includes an annular flange 126 extending radially outward therefrom. The first end 120 must be sized to accept the proper sized auger.

The second end 122 of the inner barrel 76 is also open and further includes beveled ends 128, wherein the ends are beveled inwardly. The diameter of the second end 122 is substantially equivalent to the diameter of the first end 120 such that material input into the inner barrel 76 is capable of exiting the inner barrel 76.

Reference is made to the discussions above regarding the mounting flange 92. However, in this embodiment, the mounting flange 92 is coupled to the inner barrel 76 at the coupling position 124. The coupling position 124 is determined, in part, from the length of the outer barrel 74, wherein the distance between the coupling position 124 and the second end 122 will be about the length of the outer barrel 74 plus an amount in the range of about 0.25"-0.5". In one preferred embodiment, the inner barrel 76 extends 0.25" longer than the outer barrel 76.

With reference to FIG. 10, an auger 130 or screw type conveyor having an opening 127 and an annular flange 129 is disposed within the hollow chamber 118 to move material into the system. Flange 129 of the auger couples to flange 126 of the inner barrel 76. Suitable augers are well known in the art. An auger or screw type material transport is typically used in instances where the material to be conveyed is hot or can damage or destroy the outer surface 98 of the inner chamber 76 as the auger can be treated for specific needs, e.g., chemically treated or heat treated.

In these systems, material falls from the second end 54 of the hopper 42 and is deposited in the auger 130 through the opening 127. The auger 130 moves the material from the point of deposit to the second end 122 of the inner chamber 76. The air, which has entered the system in the same manner as described above, picks up the material at the second end 122 of the inner chamber 76. The remainder of the process, as described above, is the same.

The boundary layer and laminar flows developed by embodiments of this invention are capable of maintaining a steady state flow in excess of one mile. Further, these flows can experience elevation changes, such as, for example, 200 foot vertical and directional changes, such as, for example, about 90' to 180', without loss of the steady state flows. Further, due to the relatively low pressure of the input air coupled with the configuration of the mixing chamber 64, this system achieves operating pressures of about 1-9 psi though the system can operate at pressures up to the maximum obtained by the air system, such as, for example, 12 psi. In addition to reducing blowback problems and increasing distances traveled by the materials, this system has substantially lower operating costs.

In one embodiment, a mile of 2" schedule 40 PVC water pipe, coupled together every 20 feet, successfully transported coal through the conduit to the predetermined destination without interruption of the laminar flow, as evidenced by the steady state of the output from the conduit. Further, this piping was laid along an uneven and curved pathway such that the materials traveled through elevational and directional changes. In another instance, 75 tons per hour of coal were moved in a 100' vertical direction and through a 180 degree turn and down 100' vertical to a collection bin.

Due to the extremely high velocities attained by the material within the flows, laminar and vortex, materials exiting the conduit have been dewatered during transport. Indeed, a product of 3" or less can be dried to within 10% or less of its surface moisture. In some preferred embodiments, a vacuum is coupled to the conduit outlet 66 at various locations and enhances the moisture removal ability of the process. Further, as the materials are all moving at the same velocity, but have different mass, therefore different momenta, the particulate material will naturally separate out according to mass at the discharge point. Thus, one benefit of this system includes the separation of input materials upon discharge. A collection bin for different particulates need only be placed near the outlet 66 to capture the separated particulate material upon exiting the system.

Figure 11:
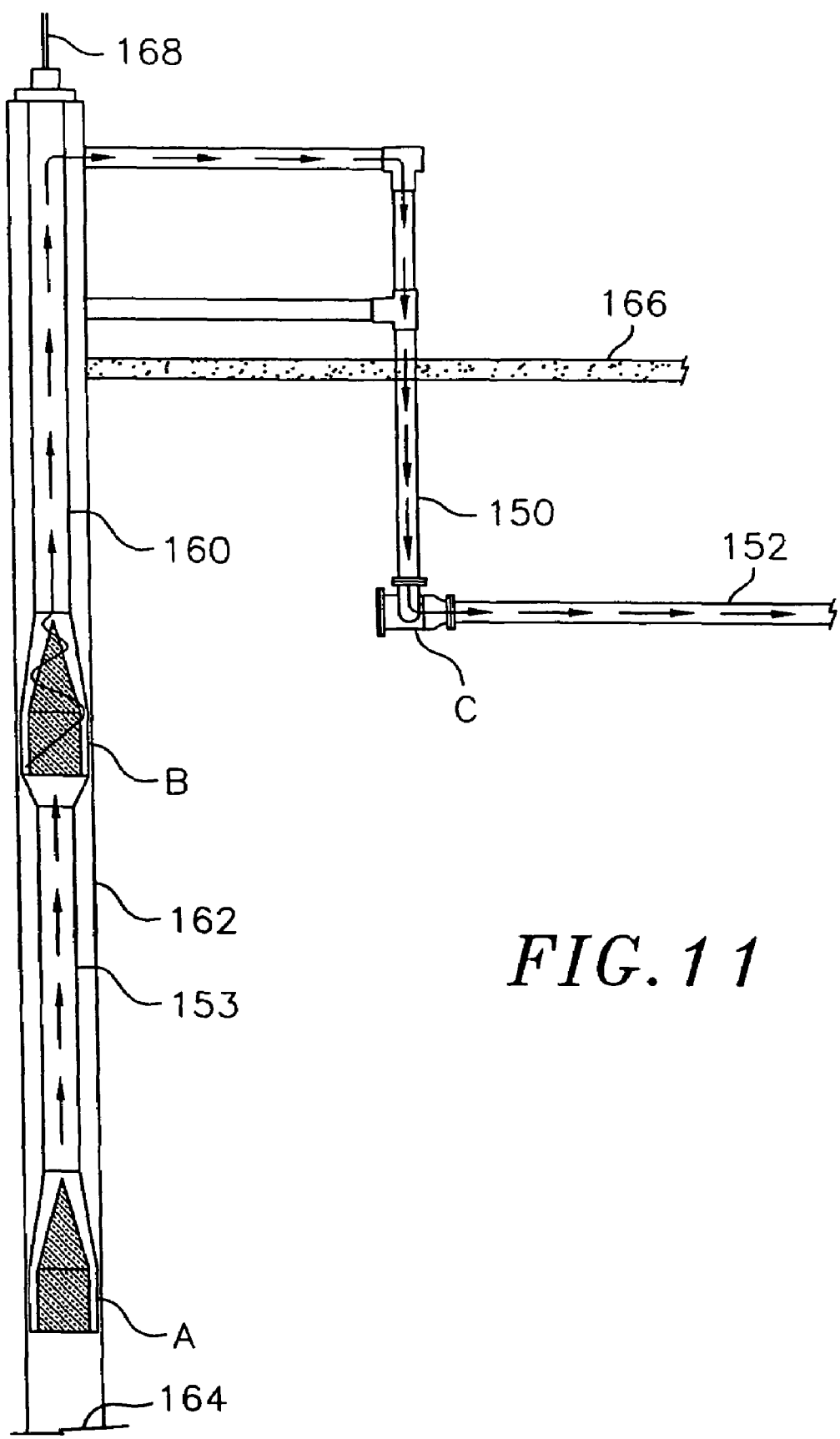
FIG. 11 is a schematic of another embodiment of a liquid and/or gas conveying system embodying features of the present invention.

In reference to FIG. 11, a flow development chamber can be placed in several different locations in a gas flow line and gas well, alone or in series, as shown. At location A, a mixing chamber for tangential input of a flowable material at the base of a gas well, or a "down-hole device", is shown. The down-hole device at location A can be placed above a natural gas source 164, such as gas formation sands, inside casing 162 and below ground level 166. A description of this embodiment is below with reference to FIGS. 14*a-b*. At location B, a mixing chamber for axial input of a flowable material, or an "in-line device", is shown in-line with tubing 153 and 160. A description of this embodiment is below with reference to FIGS. 15*a-b*. At location C, a mixing chamber for tangential input of a flowable material, or a "flow-line device", is shown joining two sections of piping 150 and 152 which can output the material flow into a separator tank or gathering system, as described below in reference to FIG. 13.

Figure 12:
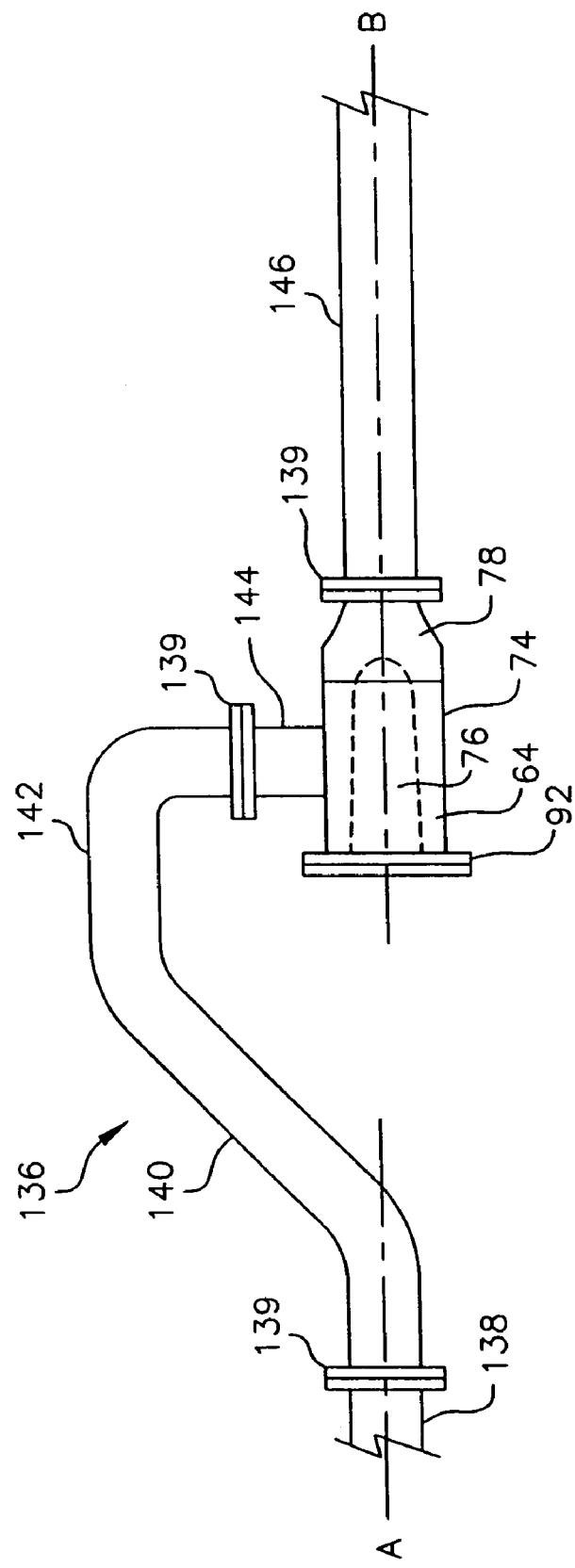
FIG. 12 is a schematic of an embodiment of a horizontal material flow conduit embodying features of the present invention.

The flow development chamber embodiments discussed above can also be added or retrofitted to an existing linear pipeline. One segment of the pipeline can be removed and replaced with a spool piece and a mixing chamber. With reference to FIG. 12, a spool piece 136 is coupled between two existing piping segments 138, 146 in a horizontal material flow conduit. The line of flow in the pipeline runs along the line A-B. In this embodiment, no blower assembly, feed section, or PLC controls are necessary. The material flows downstream from A-B through the first existing piping segment 138 and into the spool piece 136. The spool piece 136 includes piping segments 140, 142, 144, which can be connected to the existing piping and mixing chamber by flanges 139. Piping segment 144 functions like inlet conduit 62 of FIGS. 2-3*b* and 8*a*-8*b* to input the flowable material into the mixing chamber 64. One skilled in the art will understand that the piping in the spool piece 136 can be configured in numerous ways to allow the material to flow from the first existing piping segment 138 to the lateral edge of the mixing chamber 64. The mixing chamber is coupled to the second existing piping segment 146, which functions like conduit outlet 66 of FIGS. 1-3*a* and 6-7.

In one embodiment, the spool piece 136 and mixing chamber 64 are coupled to two segments of a 10" high pressure (1,000 psi) gas line. Piping segments 140, 142, 144 have 10" diameters. The outer barrel 74 has a 16" diameter and the inner barrel 76 has a 12" diameter. 2" and 6" diameter high pressure gas lines are also common and can be coupled to a proportionally sized mixing chamber and spool piece tubing. These embodiments can also be used for a wide range of pressures, from about 1 psi to over 1,500 psi, and can also establish the boundary layer and laminar flows with a non-compressible fluid, such as water or oil, when accompanied by a gas.

Figure 13:
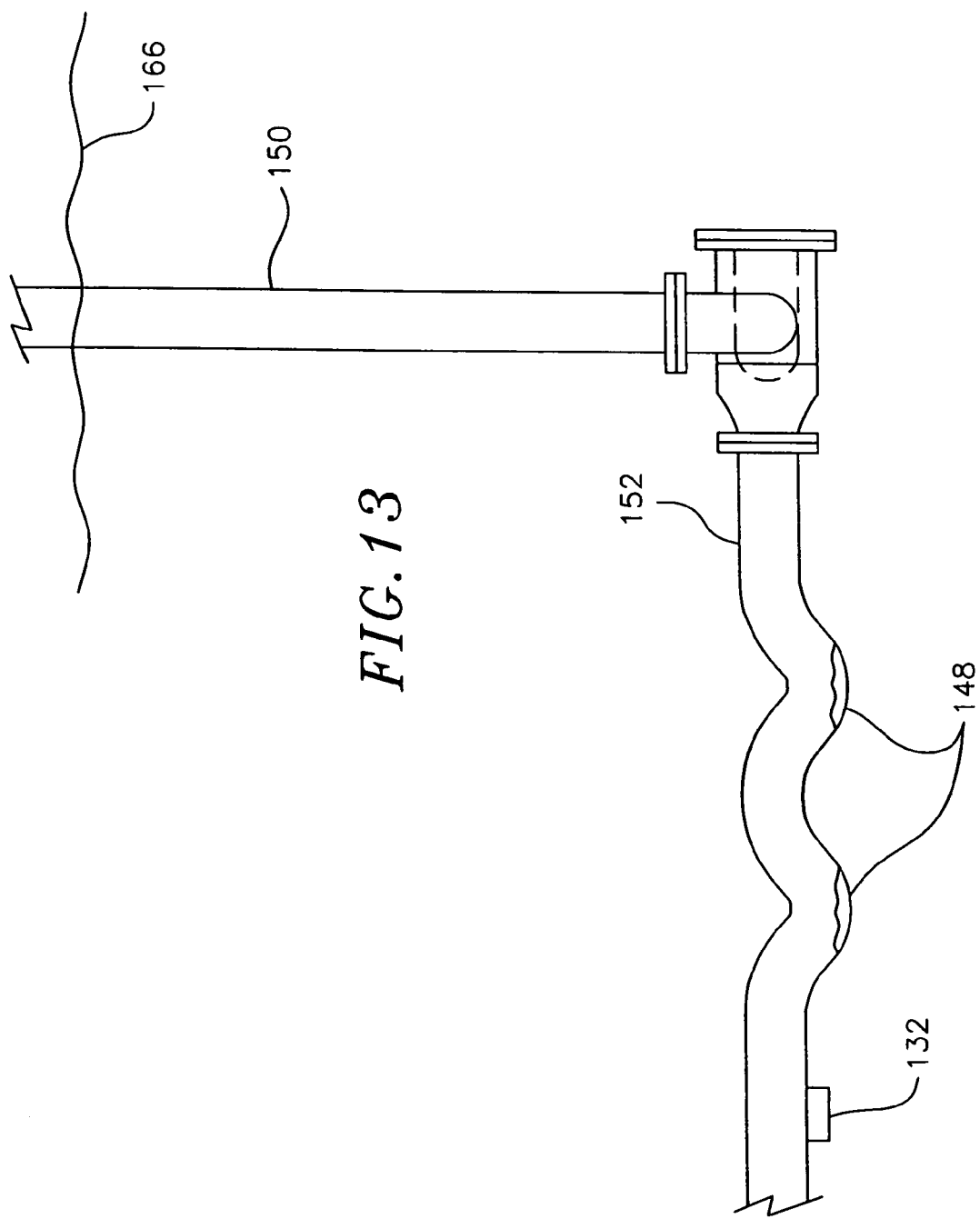
FIG. 13 is a schematic of a natural gas line with high pressure areas due to liquid buildup.

Embodiments of this invention can also exclude a spool piece if retrofit into an existing linear pipeline is unnecessary. With reference to FIG. 13, the mixing chamber 64 is shown coupled to two natural gas line segments in a flow line with accumulated fluids in low points 148 in the line. The first gas line segment 150 descends underground to input the natural gas into the inlet conduit 62 and the mixing chamber 64. The second natural gas line segment 152 is coupled to a moisture collection system 132 to remove the accumulated fluids from the gas line by the method described above. Removal of these accumulated fluids increases gas production and reduces high pressure areas in the line.

Figure 14A:
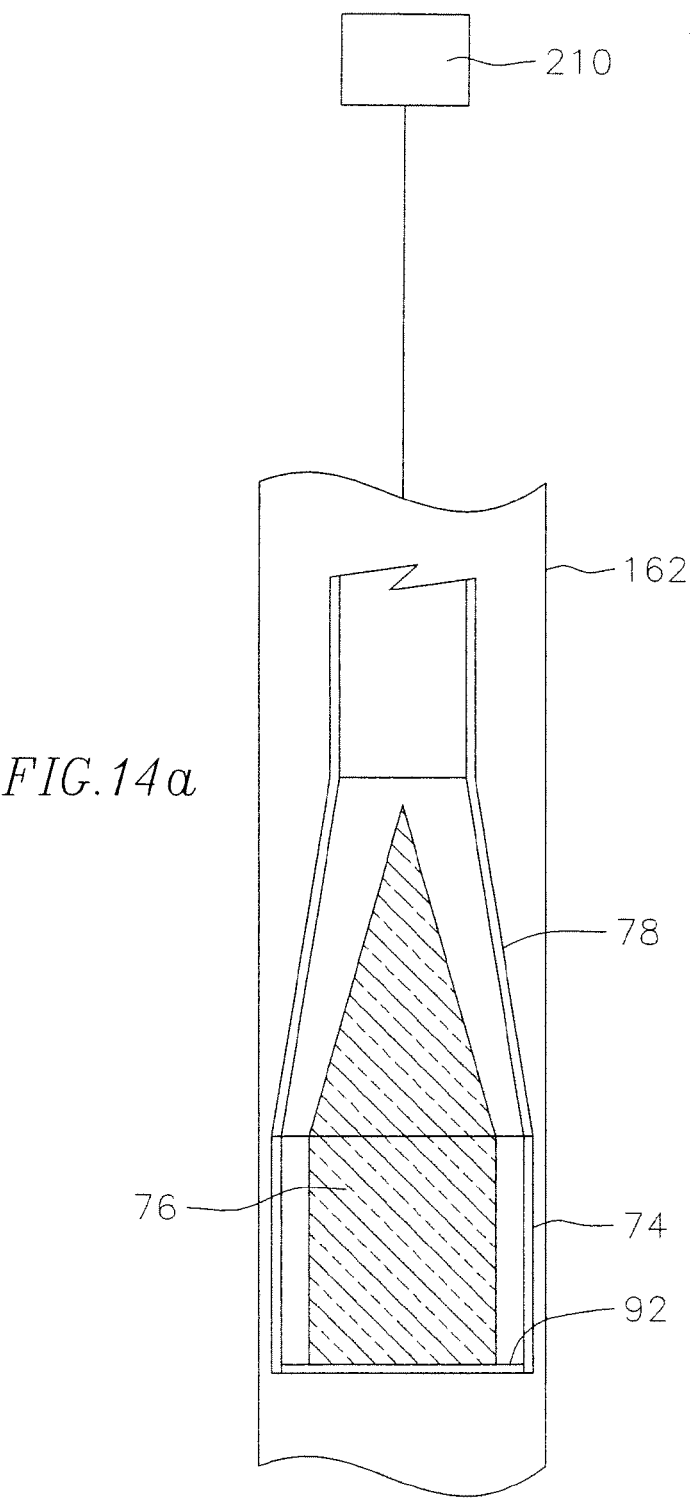
FIG. 14a is a cross-section of an embodiment of a downhole device embodying features of the present invention.
Figure 14B:
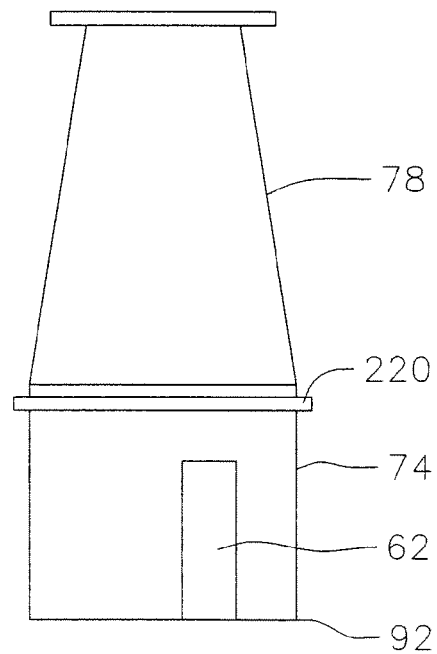
FIG. 14b is a view of the outer surface of the outer barrel and inlet opening of one embodiment of the present invention.
Figure 15A:
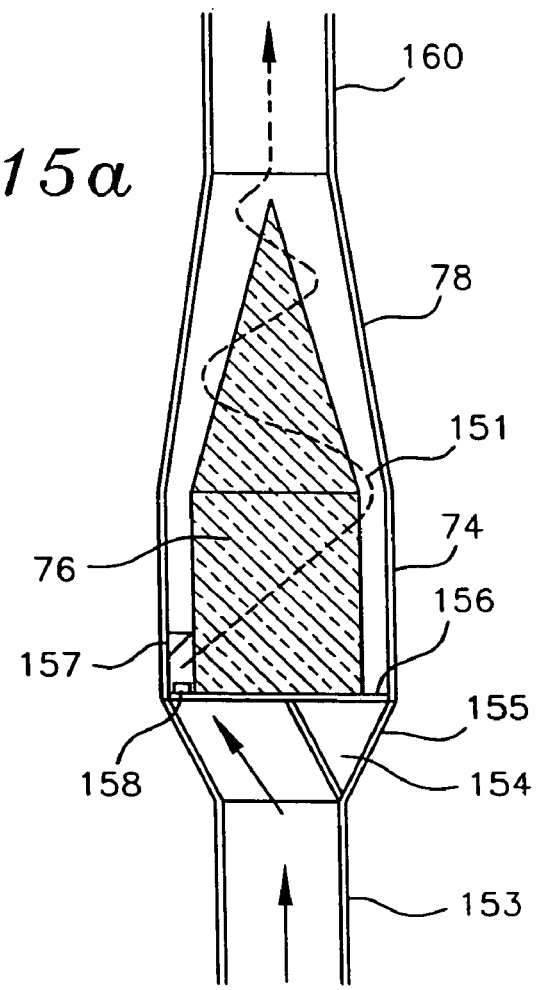
FIG. 15a is a cross section of an embodiment of the invention for axial input of the material flow.
Figure 15B:
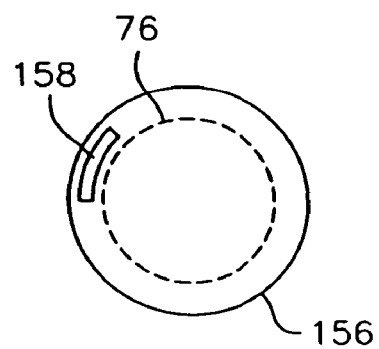
FIG. 15b is a view of the inlet plate of one embodiment of the invention.

With reference to FIGS. 14*a-b*, the mixing chamber 64 is shown at the bottom of a gas well. Natural gas flows into the mixing chamber 64 through the inlet 62. The natural gas can be made to flow into the inlet 62 by either pressurizing the casing 162 with gas or air from a pressurization device 210, or fixing a seating nipple 220 above the opening to restrict the flow of gas from flowing above the inlet 62. The natural gas flows around the inner barrel 76, and through the accelerating chamber 78, as described above. The inner barrel 76 can be formed with a substantially conical end, as shown, allowing the annular space between the inner barrel 76 and the accelerating chamber 78 to increase toward the outlet end of the inner barrel 76. This shape of the inner barrel 76 has been shown to lift fluids vertically in gas wells better than a substantially cylindrical end of the inner barrel 76. A conical inner barrel is also effective in lifting fluids vertically in gas wells.

The mixing chamber can also be configured to accept the flowable material axially. Axial input can be advantageous by allowing installation of the mixing chamber between existing linear pipelines without the need for extra tubing. In reference to FIGS. 15*a-b*, tubing 153 is coupled to a substantially conical input conduit 155, that is coupled to inlet plate 156. Deflectors 154, 157 deflect the flow 151 of material through the inlet opening 158 in the inlet plate 156 and around the inner barrel 76 to establish a vortex flow. Deflector 154 deflects the flow entering the input conduit 155 toward one edge of the input conduit 155. The flow then passes through the inlet opening 158 and into the annular space between the outer barrel 74 and the inner barrel 76. The flow is then deflected again by deflector 157 to direct it tangentially around the inner barrel 76. The deflectors can include deflecting plates, a spiraling tube, or any material capable of deflecting the flow of the material to circulate around the inner barrel 76. Other suitable materials and configurations for such deflectors should be apparent to one skilled in the art. The flow can then develop into a boundary layer and laminar flow as it progresses through the accelerating chamber 78 and out through tubing 160. By inputting the flowable material into the mixing chamber axially, the chamber can be more easily coupled to existing pipelines. This embodiment can be installed in the middle of tubing or other piping, to reestablish a laminar flow that has deteriorated.

The measurements given in this disclosure are not intended to limit the invention. Indeed, variations in the size of this system have proven effective and this system is capable of operating as a free standing unit or a cabinet mounted system, e.g., on a trailer which can be transported.

Although the foregoing describes the invention with preferred embodiments, this is not intended to limit the invention. Rather, the foregoing is intended to cover all modifications and alternative constructions falling within the spirit and scope of the invention.

What is claimed is:

1. A flowable material handling system comprising:
   a tubular casing;
   a flow development chamber fixed inside the tubular casing, the flow development chamber comprising an outer barrel inside the tubular casing and an inner barrel inside the tubular casing, the outer barrel having an inlet, an outlet, and a tubular wall extending along a longitudinal axis in a direction from the inlet to the outlet, the inner barrel located inside the outer barrel to define a flow space between the outer barrel and the inner barrel to permit flow of flowable material from the inlet to the outlet of the outer barrel;
   deflector means for deflecting flowable material inside the casing around the inner barrel;
   wherein the tubular casing, the flow development chamber and the deflector means are configured and arranged to set up a flow pattern in the flow space such that flowable material flowing into the inlet of the outer barrel will circulate around the inner barrel and traverse the flow space from the inlet to the outlet of the outer barrel;
   wherein the inlet comprises an opening extending transversely to the longitudinal axis through the tubular wall to the flow space between the outer barrel and the inner barrel; and wherein the deflector means comprises a seating nipple spaced from the inlet opening in a direction of flow of the flowable material and located between the outer barrel and the tubular casing to cause flowable material flowing inside the casing to enter the inlet opening.

2. A flowable material handling system comprising:
a tubular casing;
a flow development chamber fixed inside the tubular casing, the flow development chamber comprising an outer barrel inside the tubular casing and an inner barrel inside the tubular casing, the outer barrel having an inlet, an outlet, and a tubular wall extending along a longitudinal axis in a direction from the inlet to the outlet, the inner barrel located inside the outer barrel to define a flow space between the outer barrel and the inner barrel to permit flow of flowable material from the inlet to the outlet of the outer barrel;
deflector means for deflecting flowable material inside the casing around the inner barrel;
wherein the tubular casing, the flow development chamber and the deflector means are configured and arranged to set up a flow pattern in the flow space such that flowable material flowing into the inlet of the outer barrel will circulate around the inner barrel and traverse the flow space from the inlet to the outlet of the outer barrel;
wherein the inlet comprises an opening extending transversely to the longitudinal axis through the tubular wall to the flow space between the outer barrel and the inner barrel; and
wherein the deflector means comprises a pressurization device configured to pressurize the tubular casing to cause flowable material flowing inside the casing to enter the inlet opening.

3. A flowable material handling system comprising:
a tubular casing;
a flow development chamber fixed inside the tubular casing, the flow development chamber comprising an outer barrel inside the tubular casing and an inner barrel inside the tubular casing, the outer barrel having an inlet, an outlet, and a tubular wall extending along a longitudinal axis in a direction from the inlet to the outlet, the inner barrel located inside the outer barrel to define a flow space between the outer barrel and the inner barrel to permit flow of flowable material from the inlet to the outlet of the outer barrel;
deflector means for deflecting flowable material inside the casing around the inner barrel;
wherein the tubular casing, the flow development chamber and the deflector means are configured and arranged to set up a flow pattern in the flow space such that flowable material flowing into the inlet of the outer barrel will circulate around the inner barrel and traverse the flow space from the inlet to the outlet of the outer barrel;
further comprising an inlet plate at one end of the tubular wall extending transversely to the longitudinal axis, and the inlet comprises an opening extending longitudinally through the inlet plate to the flow space between the outer barrel and the inner barrel.

4. The flowable handling system of claim 3 wherein the deflector means comprises at least one deflector inside the outer barrel adjacent the inlet opening to deflect flowable material flowing inside the casing around the inner barrel.

5. A flowable material handling system comprising:
a tubular casing;
a flow development chamber fixed inside the tubular casing, the flow development chamber comprising an outer barrel inside the tubular casing and an inner barrel inside the tubular casing, the outer barrel having an inlet, an outlet, and a tubular wall extending along a longitudinal axis in a direction from the inlet to the outlet, the inner barrel located inside the outer barrel to define a flow space between the outer barrel and the inner barrel to permit flow of flowable material from the inlet to the outlet of the outer barrel;
deflector means for deflecting flowable material inside the casing around the inner barrel;
wherein the tubular casing, the flow development chamber and the deflector means are configured and arranged to set up a flow pattern in the flow space such that flowable material flowing into the inlet of the outer barrel will circulate around the inner barrel and traverse the flow space from the inlet to the outlet of the outer barrel;
wherein the tubular wall comprises a cylindrical wall and a conical wall between the inlet and the outlet, the conical wall having a substantially conical interior surface that converges in a direction from the inlet to the outlet; and,
wherein the inner barrel comprises a substantially conical end.

6. The flowable handling system of claim 5, wherein the conical end of the inner barrel allows flow space between the inner barrel and the conical wall to increase in a direction from the inlet to the outlet.

* * * * *

UNITED STATES PATENT AND TRADEMARK OFFICE
CERTIFICATE OF CORRECTION

PATENT NO. : 7,650,909 B2  Page 1 of 1
APPLICATION NO. : 11/475742
DATED : January 26, 2010
INVENTOR(S) : Lane et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this

Twenty-third Day of November, 2010

David J. Kappos
*Director of the United States Patent and Trademark Office*